April 7, 1959
C. E. TIMMONS
2,880,695
MECHANICAL STROKING DEVICE
Filed Sept. 11, 1956
3 Sheets-Sheet 1
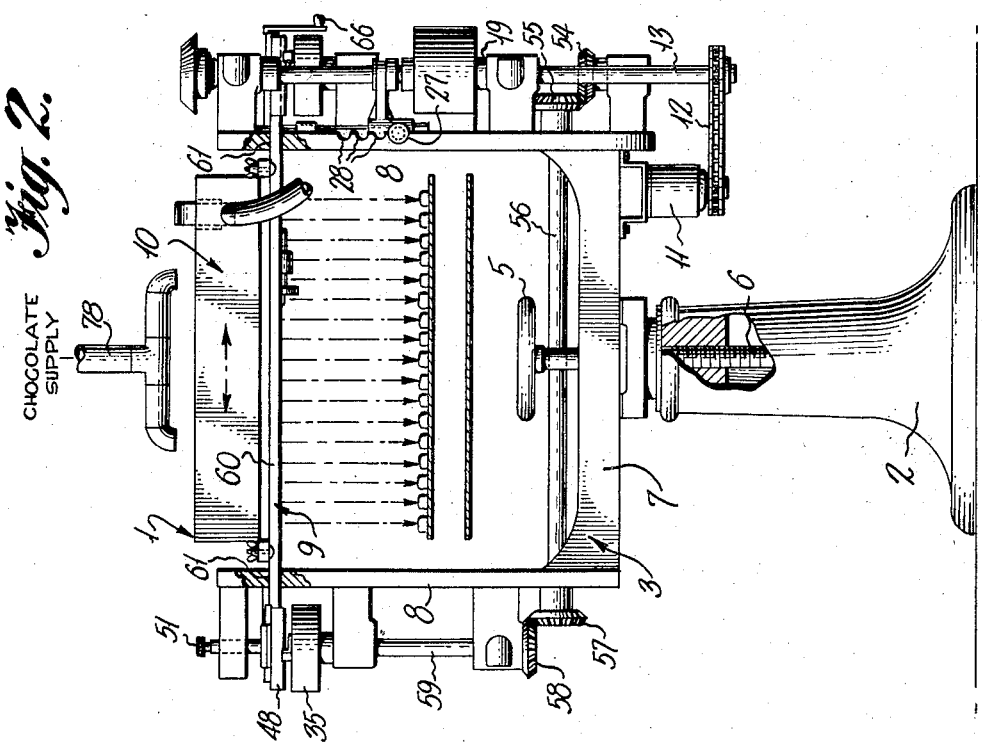
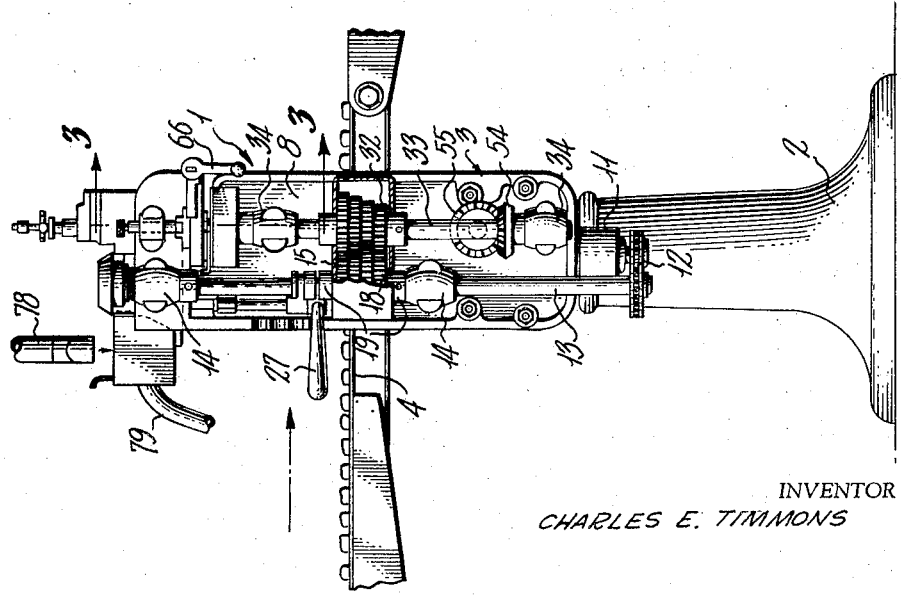
INVENTOR
CHARLES E. TIMMONS
BY
Mason, Fenwick & Lawrence
ATTORNEYS April 7, 1959  C. E. TIMMONS  2,880,695
MECHANICAL STROKING DEVICE
Filed Sept. 11, 1956  3 Sheets-Sheet 2
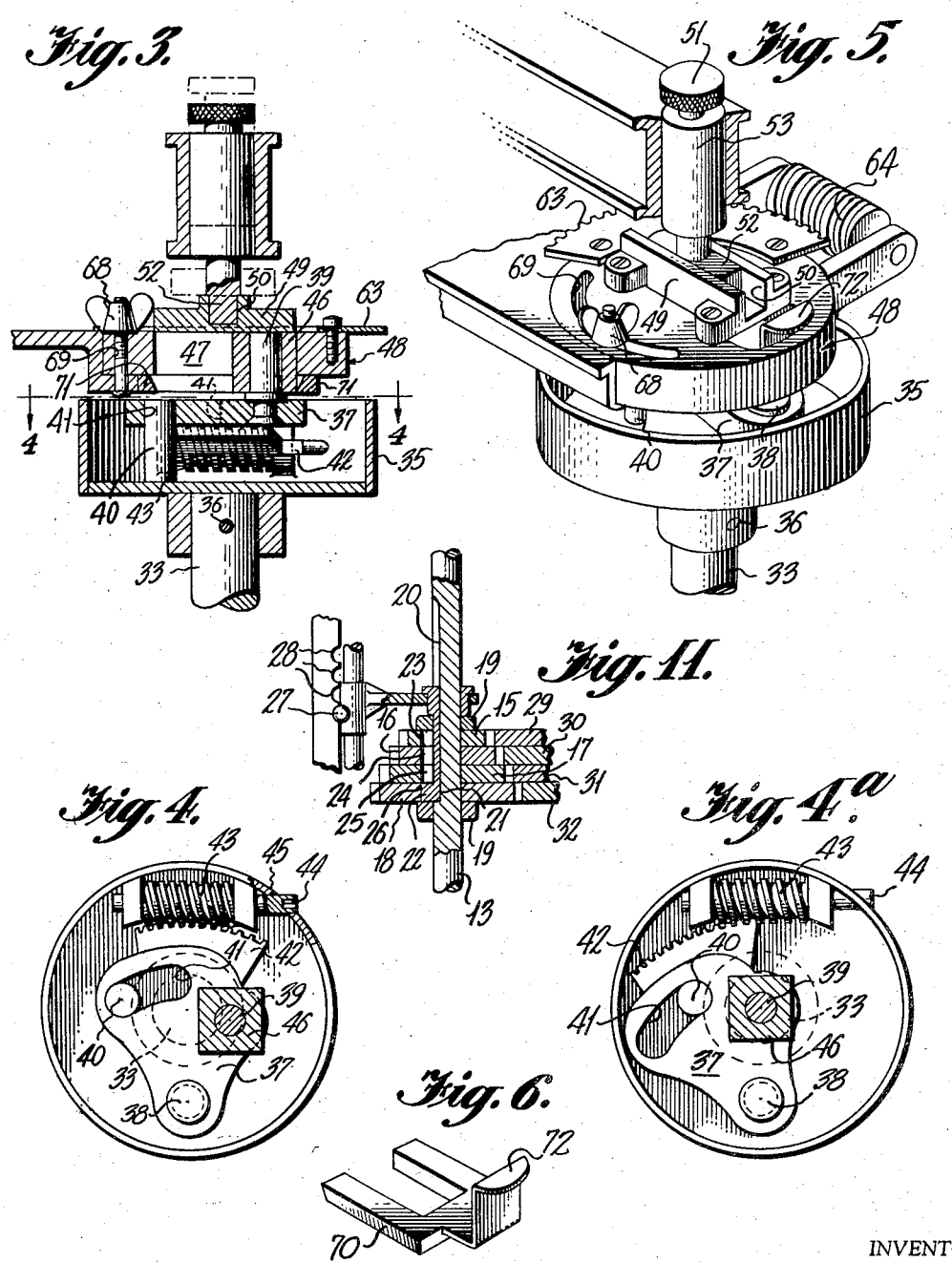
INVENTOR
CHARLES E. TIMMONS April 7, 1959     C. E. TIMMONS     2,880,695
MECHANICAL STROKING DEVICE Filed Sept. 11, 1956     3 Sheets-Sheet 3

INVENTOR
CHARLES E. TIMMONS

BY Mason, Fenwick & Lawrence
ATTORNEYS

United States Patent Office 2,880,695
Patented Apr. 7, 1959

2,880,695

MECHANICAL STROKING DEVICE

Charles E. Timmons, Westville, N.J., assignor to Stephen F. Whitman & Son, Inc., Philadelphia, Pa., a corporation of Pennsylvania Application September 11, 1956, Serial No. 609,313

5 Claims. (Cl. 118—14)

This invention relates to automatic devices for decorating confections as they move in continuous procession through the machine.

It has been customary to enhance the appearance of confections, particularly chocolate candies, by decorating them with various designs. The decorations also serve to distinguish pieces having different centers, such as nougat, caramel, nut, etc. The decorating is usually done by applying strings of liquid chocolate to the top surface of the chocolate coated candy to form a raised or embossed design.

The decorating has been accommmplished largely by hand application by highly skilled workers. This is not only expensive, but very slow and tedious.

It is the object of the present invention to provide a machine which will automatically put the chocolate string designs on the candy as the candy moves through the machine.

Another object is the provision of a machine of this kind which can be adjusted to produce many different designs.

A more specific object of the invention is to provide a device which will produce one or more controlled streams of liquid chocolate from a source of supply and by imparting lateral movement to the stream cause it to be deposited upon chocolates moving beneath in a predetermined design.

Other objects of the invention will become apparent from the following description of one practical embodiment thereof when taken in conjunction with the drawings which accompany, and form part of this specification.

In the drawings:

Figure 1 is a side elevation of a confection decorating machine embodying the principles of the present invention, the machine being shown in position over the delivery belt from a chocolate enrobing machine;

Figure 2 is a front view of the structure shown in Figure 1;

Figure 3 is a vertical section through one of the lateral motion controls, and is taken on the line 3—3 of Figure 1;

Figure 4 is a horizontal section taken on the line 4—4 of Figure 3, with the control pin shown in position to produce maximum lateral motion;

Figure 4a is a view similar to Figure 4 but with the control pin adjusted for no lateral throw;

Figure 5 is a perspective view of the structure shown in Figure 4;

Figure 6 is a perspective view of a slide used to control the effective movement of the control pin in one direction;

Figure 11 is a detail, illustrating the drive shaft and the manner of selectively coupling a drive gear to the drive shaft.

Figure 7:
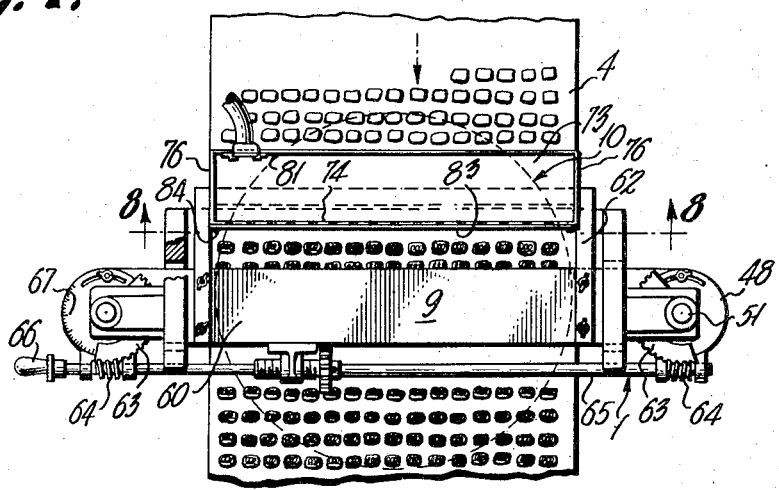
Figure 7 is a top plan view of the machine.
Figure 8:
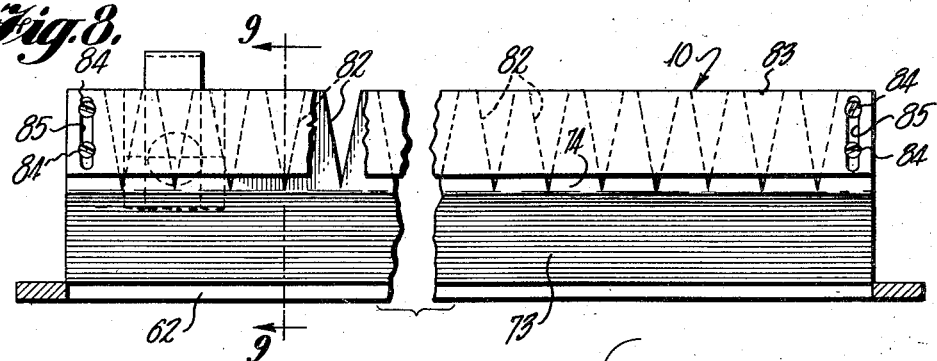
Figure 8 is a front elevation, parts being broken away, of the liquid chocolate pan.
Figure 9:
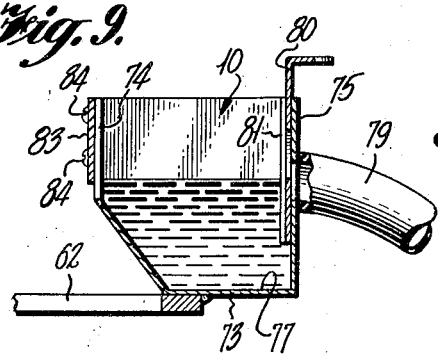
Figure 9 is a vertical section through the pan shown in Figure 8.
Figure 10:
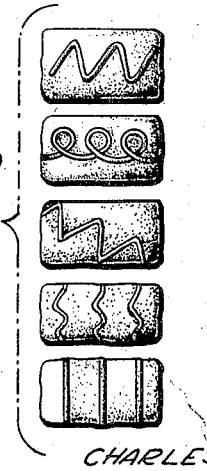
Figure 10 shows several chocolates illustrating some of the designs which can be produced by the machine.

In general, the invention comprises a machine which is adapted to position a liquid chocolate reservoir over a moving belt carrying chocolates, with one or more orifices in the reservoir through which the chocolate may flow in a stream or streams, and means to move the reservoir in a horizontal direction to cause the stream or streams to form patterns on the chocolates on the belt. There are means to control the length of the stream, the cross-sectional size of the stream, the degree and pattern of movement of the liquid chocolate reservoir and the speed with which the reservoir is moved.

Referring to the drawings in detail, there is shown a confection decorating machine 1, having a pedestal 2 supporting an arbor 3 which straddles a feed belt 4 carrying confections through the machine. If the machine is used to decorate chocolates, the belt 4 may conveniently be the delivery belt from an enrobing machine (not shown). The arbor is adjustable vertically relative to the pedestal so that the arbor position with respect to the belt 4 may be changed. This may be done in any convenient manner, such as by the handwheel 5 turning the screw 6.

The arbor consists of a bottom rail 7, and spaced legs 8. The tops of the legs are bridged by a movable member 9 which supports a liquid chocolate reservoir 10. The mounting of these parts will be described later. The operating mechanism is supported upon the legs 8.

The machine is operated by a motor 11, mounted on the arbor 3, and connected by chain 12 to a vertical drive shaft 13. This shaft extends the length of the leg 8 and is journalled near its ends, as at 14. Shaft 13 carries four drive gears 15, 16, 17, 18 of progressively increasing size, which are freely rotatable on the shaft and held against axial movement by the collars 19. Shaft 13 is grooved, as at 20, to form a keyway, and a key 21 is slidably mounted in it. For the major portion of its length, key 21 is of the same cross-section as groove 20 in shaft 13, but it has a projection 22 at its end to be engaged selectively with keyways 23, 24, 25 and 26 in the driving gears. By moving the key along the keyway in the shaft, the projection 22 can be engaged in the keyway of any selected gear to couple that gear to the shaft. The remaining gears will be freely rotatable. A handle 27 is connected to key 21 by means of which the key can be moved. Notches 28 are provided in the leg 8 into which the handle fits to hold the key in its selected positions of adjustment.

Each of the driving gears is in mesh with one of the driven gears 29, 30, 31 and 32, fixed to the driven shaft 33. The driven gears also are of different sizes, and it will be evident that four speeds of the driven shaft can be had for a given motor speed by coupling the different driving gears to the driven shaft. Driven shaft 33 is mounted on the leg 8 in bearings 34. Shaft 33 drives the various operating mechanisms which give lateral movement to chocolate reservoir 10.

At the top of shaft 33 an eccentric housing 35 is mounted. This housing rotates with the shaft, as it is pinned to it by a pin 36. Within the housing 35 there is a plate 37, which is pivotally mounted, as at 38, eccentrically of the housing and shaft 33. Plate 37 carries a pin 39 which controls the movement of the chocolate reservoir. It is mounted on the plate at a distance from the pivot 38 equal to the distance of the pivot from the axis of shaft 33. By rotative movement of the plate about its pivot, pin 39 may be positioned concentric to the shaft 33 or eccentric thereto. It will be obvious, that when pin 39 is eccentric to the shaft 33 rotation of the shaft and housing will cause the pin to move in a circle having a radius equal to the eccentricity of the pin. The movement of the plate is limited by means of stop 40 attached to the housing striking the ends of a slot 41 in the plate. The slot is on an arc struck from the pivotal center of the plate.

In order to adjust the pin 39, plate 37 has attached to it a gear segment 42 which is in mesh with a worm 43 journalled in the housing 35. The worm shaft may have a squared end 44, accessible through an opening 45 in the side of the housing, by means of which it can be turned for adjusting the position of pin 39.

Pin 39 is fitted with a block 46 which is slidably received in a slot 47 in a driven member 48. The slot is just wide enough to provide a free sliding fit for the block 46 and is of sufficient length to accommodate the block during the full throw of the pin 39. Thus, if the pin 39 is adjusted to an eccentric position, it will be caused to move in a circular path, and, as the block is free to slide in the slot 47, one component of the circular motion will be absorbed by a sliding movement of the block and the other component will cause the driven member 48 to be reciprocated in a direction normal to the extended direction of the slot. To insure the driven member following a straight line movement, a guide block 49 is mounted upon the top of the driven member and provided with a groove 50. It will be noted that the groove is positioned across the slot so that it will extend in the direction of movement of the driven member as described above. A key 51 having an elongated head 52 is mounted for vertical movement within a barrel 53 fixed to the frame of the machine. When the head of the key is turned into alignment with the slot and lowered into the slot, the driven member 48 can have movement only in the one direction of the slot. This will prevent accidental and undesired movement in other directions which might result from the frictional bearing of the block 46 against the sides of the slot 47.

It will be noted from Figure 1 that shaft 33 is provided with a beveled gear 54 in mesh with a gear 55 fixed to a horizontal shaft 56 (Figure 2) extending across the lower part of the arbor. A gear 57 is mounted on the opposite end of gear 56 and meshes with a gear 58 on a shaft 59 which extends vertically of the other leg of the arbor. Shaft 59 carries duplicate control mechanism to that just described for the shaft 33. In other words, an eccentric housing 35 with its eccentric plate and pin providing motion for a driven member 48 is mounted upon the end of the shaft 59.

The two driven members 48 are connected to opposite ends of a plate 60. The plate projects through slots 61 in the vertical legs of the arbor. Thus, movement of the driven members is imparted to plate 60. A U-shaped frame 62 connects the chocolate reservoir to the plate 60 so that all motion of the driven members is imparted to the reservoir.

The driven members may be adjusted so that their direction of reciprocating movement may be changed. This is accomplished by providing each of the driven members with a gear segment 63 and having worms 64 mounted on shaft 65 in mesh with the gear segments. Shaft 65 is supported from plate 60 so that it moves with the plate and the worms will maintain constant meshing engagement with the gear sectors. A crank handle 66 is provided for the shaft 65 for ease in rotating the shaft and adjusting the position of the driven members 48. The driven members may be provided with a scale 67 for accuracy in positioning the driven members to obtain a desired result. Bolts 68 have been shown passing through slot 69 in the driven members 48 for securing the driven members in adjusted positions.

In order to produce a circular design or a chain of loops, means are provided for locking the block 46 so that it cannot slide within the slot 47. This consists of locking slide 70, which is of U-shaped formation and adapted to slide between dovetail guide bars 71 rigidly fixed beneath the driven members 48. The guides are positioned so that the locking slide will move across the slot 47. It will be apparent that when slide 70 is moved forward, its legs will closely embrace the sides of block 46 and hold it against movement in the slot 47. The locking slide is provided with a finger piece 72 for ease in moving it into and out of locking engagement with the block.

The chocolate reservoir is in the form of a pan 73 having front wall 74, back wall 75, end walls 76 and bottom 77. A pipe line 78 from a suitable source feeds liquid chocolate to the pan. An overflow pipe 79 is positioned in the back, and an overflow control gate 80 is slidable in guides 81 to control the height of chocolate in the pan. The front of the pan is notched, as at 82, to provide a plurality of V-notches through which the chocolate can flow in streams. The chocolate flows through the apex of the V, and the size of the stream is controlled by a plate 83 which extends across the front of the pan. The plate is held in position by screws 84 which pass through slots 85 in the plate. This permits vertical adjustment of the plate to expose more or less of the V-notches.

It is believed that the operation of the machine will be clear from the above description. Lineal motion of the driven members 48 will impart linear reciprocation to the chocolate reservoir. The angle of movement with respect to the path of movement of the confections will determine the pattern applied. The speed of the driven member, the eccentricity of pin 39, the height of the reservoir above the belt and the size of the chocolate stream all have an effect upon the character, and particularly the size, of the pattern. When a pattern consisting of a chain of loops is desired, the slide 70 is moved forward locking the pin 39 against movement in the slot of the driven member. This will cause the driven member to follow the circular path of the driving pin. The various factors listed above can also be utilized to effect changes in the loop pattern.

While in the above, one practical embodiment of the invention has been disclosed, it will be understood that the details of structure shown and described are merely by way of illustration, and the invention may take other forms within the scope of the appended claims.

What is claimed is:

1. In a confection decorating machine of the type having a stand, a reservoir for liquid decorating material supported on said stand for movement in a horizontal plane, and means to move said reservoir in predetermined paths in said plane, the improvement which consists of said reservoir being an elongated container having surrounding upstanding walls, one of said walls having a plurality of openings therein to permit outflow of liquid from the reservoir, said openings being spaced apart longitudinally of the wall and having their bottoms aligned horizontally, said openings having upwardly diverging side walls, whereby the cross-sectional width of the liquid streams flowing through the openings will progressively increase with the cross-sectional depth of the streams.

2. In a confection decorating machine of the type having a stand, a reservoir for liquid decorating material supported on said stand for movement in a horizontal plane, and means to move said reservoir in predetermined paths in said plane, the improvement which consists of said reservoir being an elongated container having surrounding upstanding walls, one of said walls having a plurality of openings therein to permit outflow of liquid from the reservoir, said openings being spaced apart longitudinally of the wall and having their bottoms aligned horizontally, said openings having upwardly diverging side walls, and means to control the depth of liquid within the reservoir at a level above the bottoms of the openings.

3. In a confection decorating machine of the type having a stand, a reservoir for liquid decorating material supported on said stand for movement in a horizontal plane, and means to move said reservoir in predetermined paths in said plane, the improvement which consists of said reservoir being an elongated container having surrounding upstanding walls, one of said walls having a plurality of openings therein to permit outflow of liquid from the reservoir, said openings being spaced apart longitudinally of the wall and having their bottoms aligned horizontally, said openings having upwardly diverging side walls, a plate across the face of the wall having the openings and mounted for vertical adjustment to position the bottom edge thereof relative to the bottom of the openings to vary the exposed area of the openings.

4. In a confection decorating machine as claimed in claim 3, means to control the depth of liquid within the reservoir to maintain a constant head pressure.

5. In a confection decorating machine of the type having a stand, a reservoir for liquid decorating material supported on said stand for movement in a horizontal plane, and means to move said reservoir in predetermined paths in said plane, the improvement which consists of said reservoir being an elongated container having surrounding upstanding walls, one of said walls having a plurality of V-shaped notches therein to permit outflow of liquid from the reservoir, said notches being spaced apart longitudinally of the wall and having their vertices in horizontal alignment, a plate across the face of the notched wall mounted for vertical adjustment to position the bottom edge relative to the vertices of the notches, and means to control the depth of liquid within the reservoir to maintain a constant head pressure.

References Cited in the file of this patent

UNITED STATES PATENTS

| | | |
|---|---|---|
| 1,208,328 | Kihlgren | Dec. 12, 1916 |
| 1,808,696 | Van Houten | June 2, 1931 |
| 2,144,924 | King | Jan. 24, 1939 |